United States Patent [19]

Dammann

[11] Patent Number: 4,498,483
[45] Date of Patent: Feb. 12, 1985

[54] AXIAL THRESHING AND SEPARATING ARRANGEMENT

[75] Inventor: Johannes Dammann, Harsewinkel, Fed. Rep. of Germany

[73] Assignee: CLAAS OHG, Harsewinkel, Fed. Rep. of Germany

[21] Appl. No.: 572,925

[22] Filed: Jan. 20, 1984

[30] Foreign Application Priority Data

Feb. 5, 1983 [DE] Fed. Rep. of Germany ....... 3303952

[51] Int. Cl.³ .............................................. A01F 12/18
[52] U.S. Cl. .................................... 130/27 T; 56/14.6
[58] Field of Search ................. 130/27 T, 27 P, 27 R, 130/27 Q; 56/14.6

[56] References Cited

U.S. PATENT DOCUMENTS

| 3,946,746 | 3/1976 | DeCoene et al. | 56/14.6 |
| 4,117,849 | 10/1978 | Pakosh | 56/14.6 |
| 4,328,815 | 5/1982 | Rowland-Hill | 130/27 T |

FOREIGN PATENT DOCUMENTS 1222307  8/1966  Fed. Rep. of Germany.

*Primary Examiner*—Jay N. Eskovitz
*Attorney, Agent, or Firm*—Michael J. Striker

[57] ABSTRACT

An axial threshing and separating arrangement in a housing includes two threshing drums and two thresh basket-sieve casing units associated therewith, wherein the distance between the axes of rotation of the threshing drums corresponds substantially to the outer diameter of one thresh basket-sieve casing unit, and the units can be arranged over one another and overlap with their ends in the product supply region by substantially the double width of a product supply opening.

3 Claims, 3 Drawing Figures

AXIAL THRESHING AND SEPARATING ARRANGEMENT

BACKGROUND OF THE INVENTION

The present invention relates to an axial threshing and separating arrangement. More particularly, it relates to such an arrangement which has a rotary threshing drum and an associated casing unit which peripherally surrounds the threshing drum with retaining of a small gap and is subdivided into a thresh basket and a sieve, wherein the casing unit is provided in its threshing basket part with a product supply opening and at another end with a product discharge opening.

The German Auslegeschrift No. 1,222,307 discloses a threshing and separating arrangement which operates as an axial flow system. The thresh basket-sieve casing unit is formed as a double cone with oppositely directed conical parts which convey the product to its narrowest point. The width of this unit corresponds substantially to the width of a self-propelled harvester thresher, so that it can be mounted in the latter. Because of the small construction, only a limited throughput is possible. In order to avoid this disadvantage and to attain a higher throughput, it is further known to arrange an axial threshing and separating mechanism as a self-contained structural unit before the driving axle between the inclined conveyor and the cutting mechanism of a self-propelled harvester thresher, whereas the width of the axial threshing and separating mechanism considerably exceeds the machine width. Simultaneously with the above mentioned advantage of a higher throughput, it is necessary to take into consideration the disadvantage that the axial threshing and separating mechanism must be placed for the purpose of street transport onto a wagon especially manufactured therefor. In addition to this disadvantage, the thus equipped harvester thresher possesses a nose-heaviness because of the high weight provided prior to the driving axle.

SUMMARY OF THE INVENTION

Accordingly, it is an object of the present invention to provide an axial threshing and separating arrangement which avoids the disadvantages of the prior art.

More particularly, it is an object of the present invention to provide an axial threshing and separating arrangement of the above described type, which can obtain a higher throughput on the one hand, and is formed as a small structural unit which can be mounted at a suitable location in a harvester thresher, on the other hand, without exceeding in width during street transportation the outer limits of a harvester thresher fixed in correspondence with the permissible street traffic order of for example 3 meters.

In keeping with these objects and with others which will become apparent hereinafter, one feature of the present invention resides, briefly stated, in that a threshing and separating arrangement including two threshing drums and thresh basket-sieve casing units located relative to one another so that the distance between both axis-parallel axes of rotation substantially corresponds to the outer diameter of one thresh basket-sieve casing unit, and the thresh basket-sieve casing units overlap with their ends in a product supply region by substantially the double width of a product supply opening.

For retaining a harvester thresher with its contour within the above described limits despite the provision of two axial threshing and separating arrangements, it is recommended to arrange the thresh basket-sieve casing units over one another, wherein both product supply openings are vertically offset relative to one another. Since the product stream supplied to the thresh basket-sieve casing unit is subdivided prior to the product supply openings by separating means into two partial streams, a product piling in front of the supply openings is reliably excluded.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
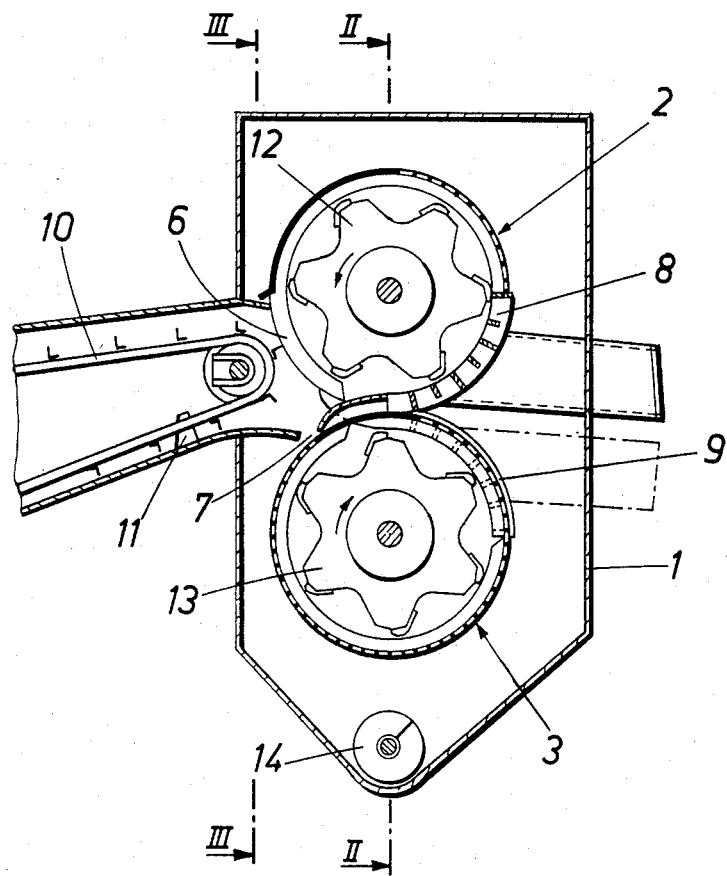
FIG. 1 is an axial threshing and separating arrangement in accordance with the present invention, in a side view in section taken along the line I—I in FIG. 3.

FIG. 1 shows a housing which is identified with reference numeral 1. Two axial thresh and sieve casing units 2 and 3 are mounted in the housing 1. Each unit 2 and 3 has a product discharge opening 4 and 5, respectively, and a product supply opening 6 and 7, respectively.

Figure 2:
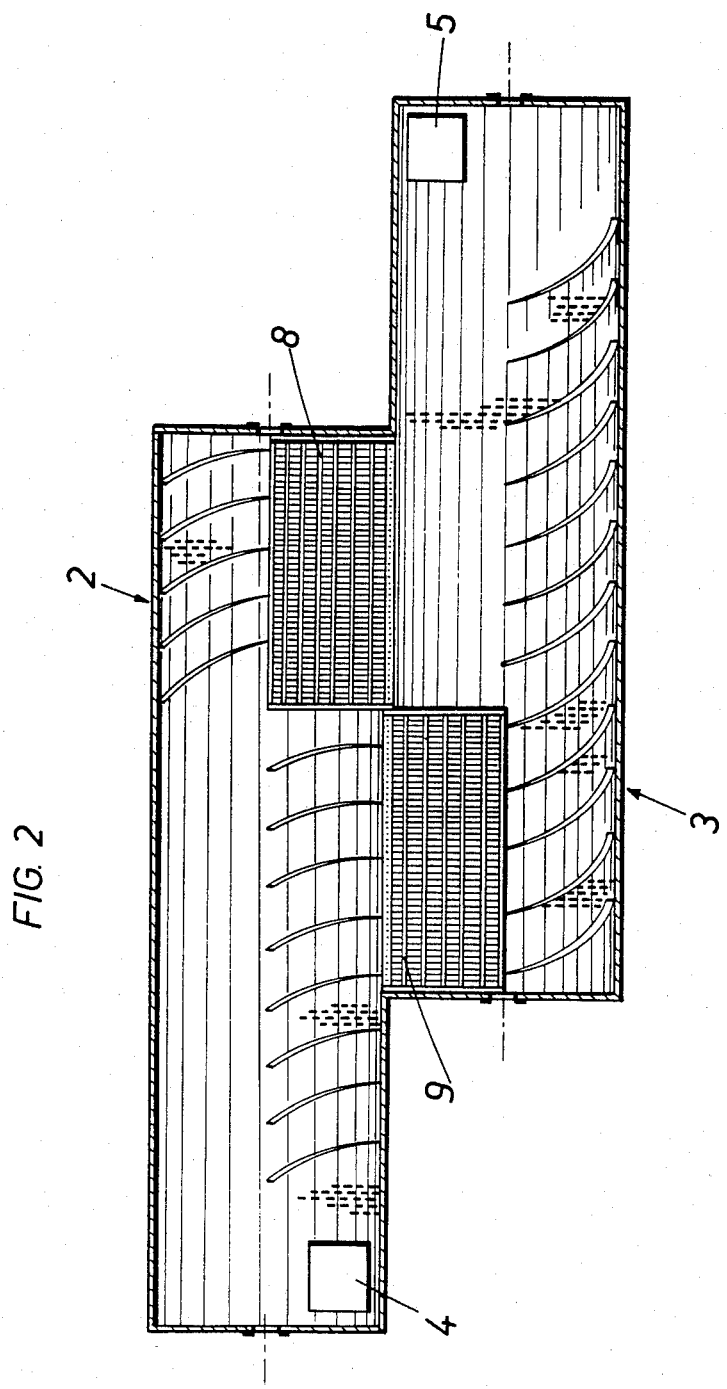
FIG. 2 is a thresh basket-sieve casing unit in a section taken along the line II—II in FIG. 1, without a threshing drum.
Figure 3:
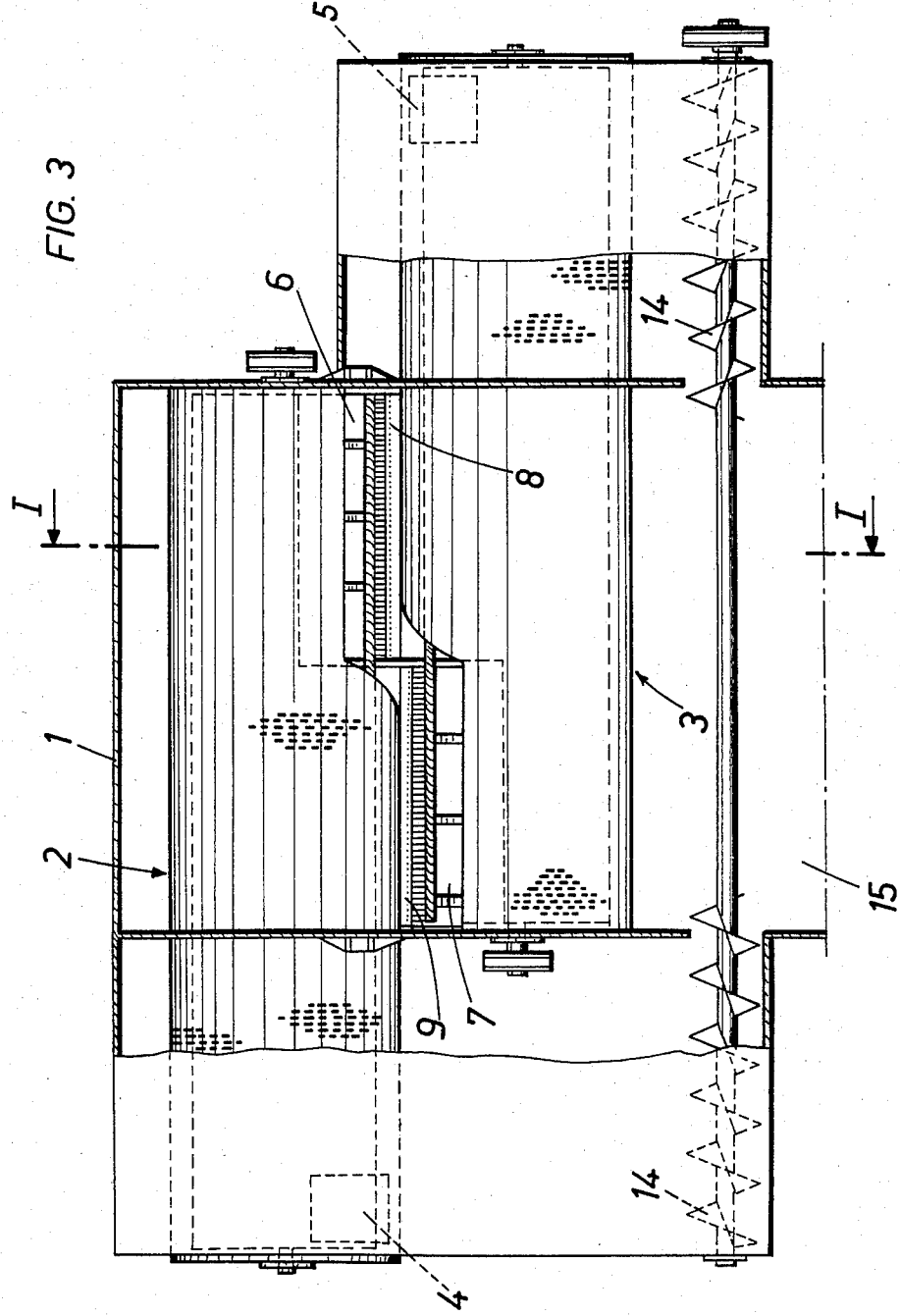
FIG. 3 is a view showing the unit of FIG. 1 in a section taken along the line III—III in FIG. 1.

Corresponding to the width of the product supply openings 6 and 7, the units 2 and 3 are formed in this region over substantially one third of their circumference as threshing baskets 8 and 9. As can be seen from FIG. 2, the units 2 and 3 overlap one another so that the product supply openings 6 and 7 or the threshing baskets 8 and 9 lie closely near one another and are offset in their height.

A product supplied for example by an inclined conveyor 10 is separated with the aid of a cutter 11 or another device into two product streams. One product stream is supplied to the opening 6 of the thresh basket-sieve casing unit 2, whereas the other product stream is supplied to the opening 7 of the thresh basket-sieve casing unit 3. Threshing drums 12 and 13 which drivingly supported in cooperation with the units 2 and 3 thresh the product in known manner. The threshed out straw is thrown through the product discharge openings 4 and 5 onto the field, whereas the grain-chaff mixture travels through the through openings available in the thresh basket-sieve casing units 2 and 3 into the lower part of the housing 1.

A connecting screw 14 is arranged in this lower part of the housing. It funnels the grain-chaff mixture and supplies the same for example to a not shown wind sieve device connected with an outlet opening 15 of the housing 1.

It will be understood that each of the elements described above, or two or more together, may also find a useful application in other types of constructions differing from the types described above.

While the invention has been illustrated and described as embodied in an axial threshing and separating device arranged in a housing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An axial threshing and separating arrangement located in a housing, comprising two threshing drums rotatable about parallel axes of rotation; and two casing units each circumferentially surrounding a respective one of said threshing drums with retaining a small gap, each of said casing units being subdivided into a thresh basket and a sieve and said thresh basket being provided with a product supply opening at its one end and with a product discharge opening at its another end, said thresh basket and sieve forming casing unit being arranged relative to one another so that the distance between said axes of rotation of said threshing drums corresponds to the diameter of one of said thresh basket-sieve casing units, and said thresh basket-sieve casing units overlap with their ends in a product supply region by substantially a double width of each product supply opening, said thresh basket-sieve forming casing units being arranged over one another and said product supply openings being located adjacent to one another in an upright direction.

2. An axial threshing and separating arrangement as defined in claim 1; and further comprising separating means arranged to separate a product stream supplied to said thresh basket-sieve casing units before said product supply openings into two partial streams.

3. An axial threshing and separating arrangement as defined in claim 1, wherein said threshing drums are rotatable in opposite directions of rotation; and further comprising means for rotating said threshing drums in opposite directions of rotation.

* * * * *